(12) United States Patent
Barlian et al.

(10) Patent No.: US 7,129,811 B2
(45) Date of Patent: Oct. 31, 2006

(54) ELECTRICAL STRUCTURAL PART AND METHOD OF ITS MANUFACTURE

(75) Inventors: Reinhold A. Barlian, Bad Mergentheim (DE); Thomas Michelbach, Lauda-Königshofen (DE); Hans-Martin Lösch, Würzburg (DE)

(73) Assignee: Bartec GmbH, Bad Mergentheim (DE)

( * ) Notice: Subject to any disclaimer, the term of this patent is extended or adjusted under 35 U.S.C. 154(b) by 176 days.

(21) Appl. No.: 10/826,137

(22) Filed: Apr. 16, 2004

(65) Prior Publication Data

US 2004/0252002 A1    Dec. 16, 2004

(30) Foreign Application Priority Data

Apr. 17, 2003  (DE) ................. 103 17 739

(51) Int. Cl.
*H01F 27/02* (2006.01)

(52) U.S. Cl. .................... 336/90; 336/92; 336/208; 335/220

(58) Field of Classification Search ................. 336/90, 336/92, 96, 208; 335/209, 220
See application file for complete search history.

(56) References Cited

U.S. PATENT DOCUMENTS

| 3,995,209 | A | | 11/1976 | Weston | |
|---|---|---|---|---|---|
| 6,114,933 | A | * | 9/2000 | Widiger et al. | 336/96 |
| 2002/0026929 | A1 | * | 3/2002 | Shimada et al. | 123/634 |
| 2002/0175791 | A1 | * | 11/2002 | LaMarca et al. | 335/220 |

* cited by examiner

*Primary Examiner*—Anh Mai
(74) *Attorney, Agent, or Firm*—Fulwider Patton LLP

(57) ABSTRACT

An electrical structural part with an electrical or electronic structural element provided on a basic body and with an encapsulation enclosing the structural element tightly and free of voids, the material structure of the encapsulation being intimately fused with the material structure of the basic body.

20 Claims, 5 Drawing Sheets

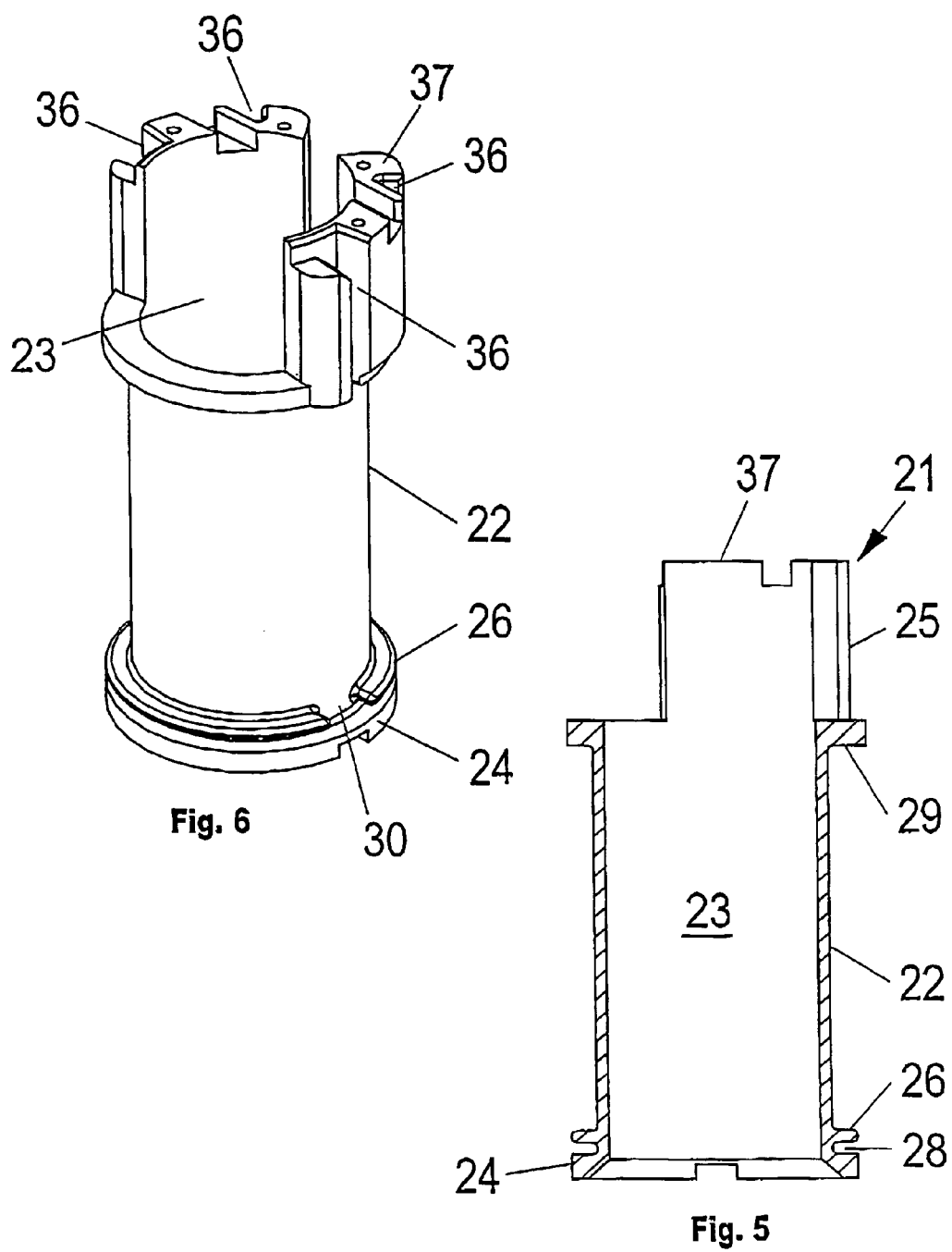

ELECTRICAL STRUCTURAL PART AND METHOD OF ITS MANUFACTURE

The invention relates to an electrical structural part with at least one electrical or electronic structural element and to a method of manufacturing such a structural part.

The object of the invention is to provide an electrical structural part and a method for its manufacturing, wherein by simple means a compact, gap-free and hermetically tight insulation as well as a high functional ability of the structural part are achieved, which is applicable in extremely endangered and/or sensible areas.

According to the invention this object is solved by the features of claims 1 and 20.

Preferred embodiments and further developments of the invention are characterized by the features of the subclaims.

Figure 1:
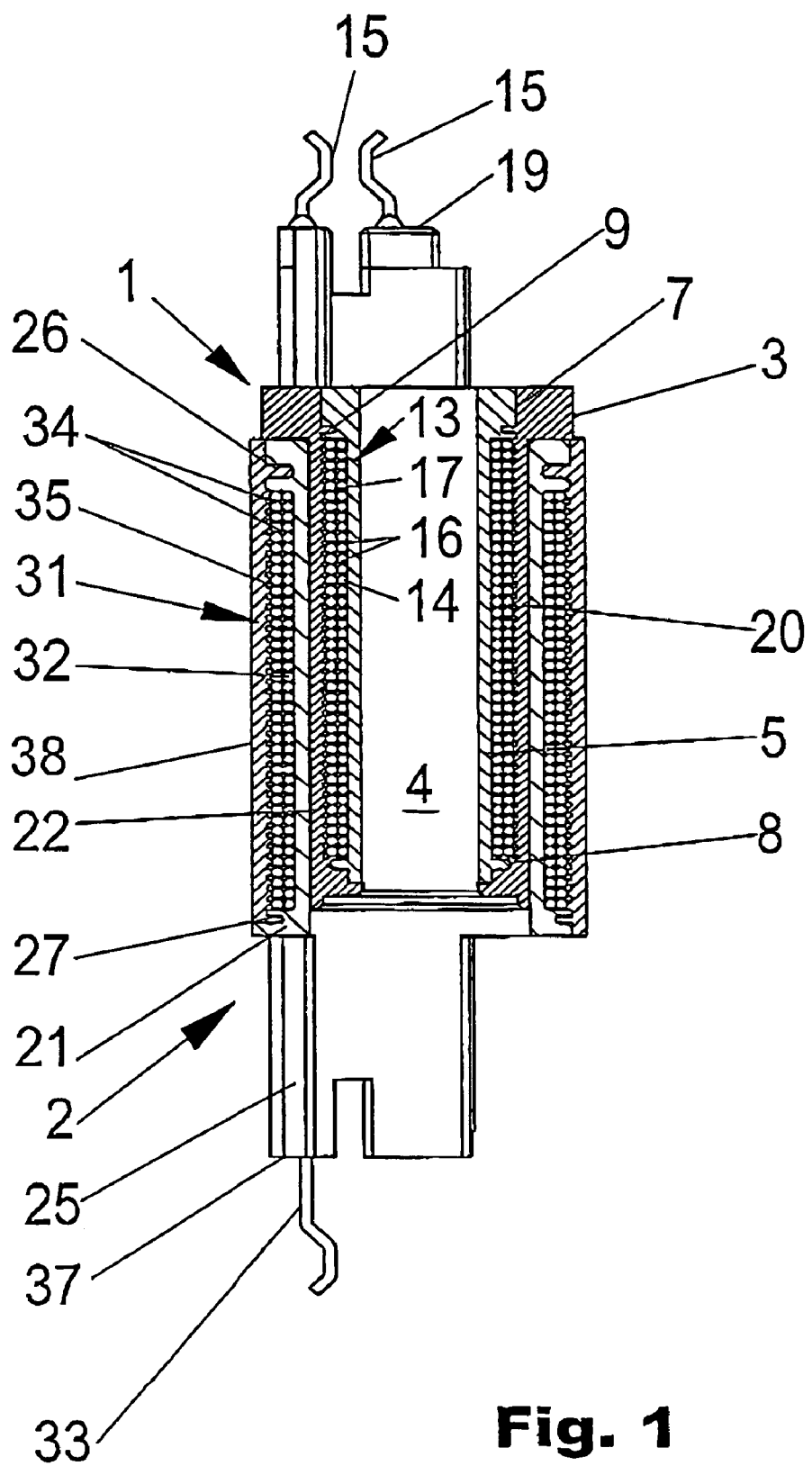
Figure 3:
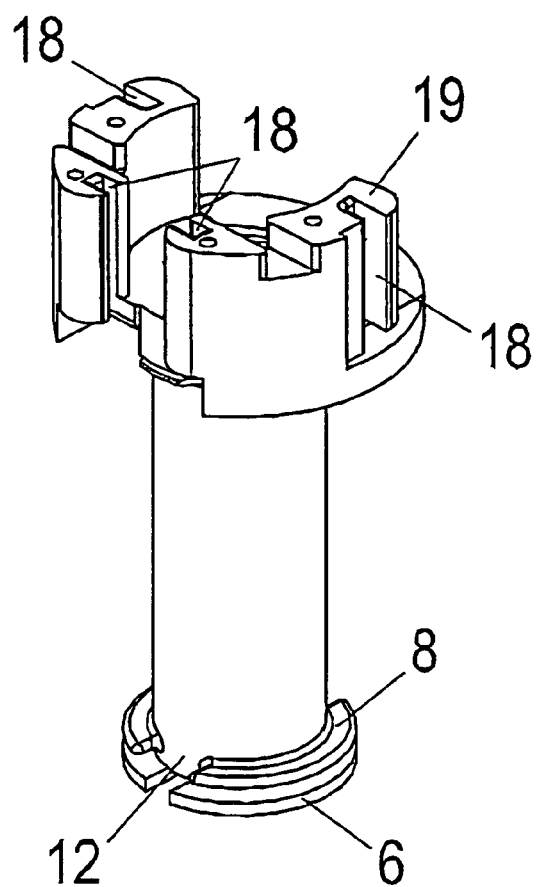
Figure 2:
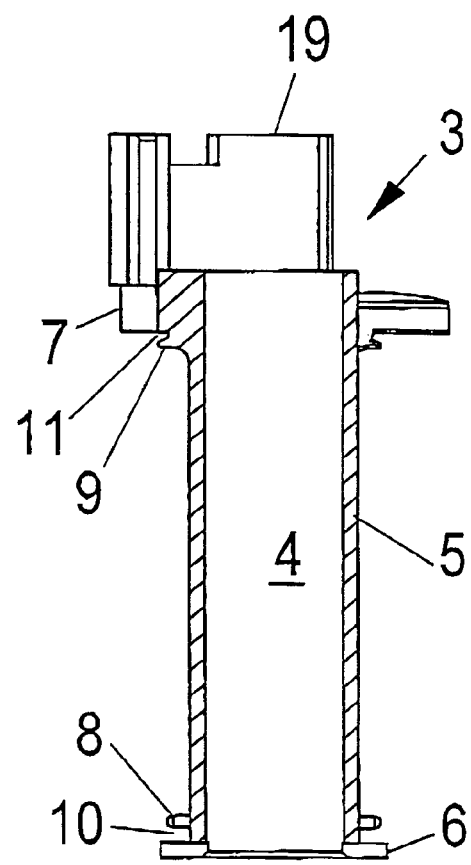
Figure 4:
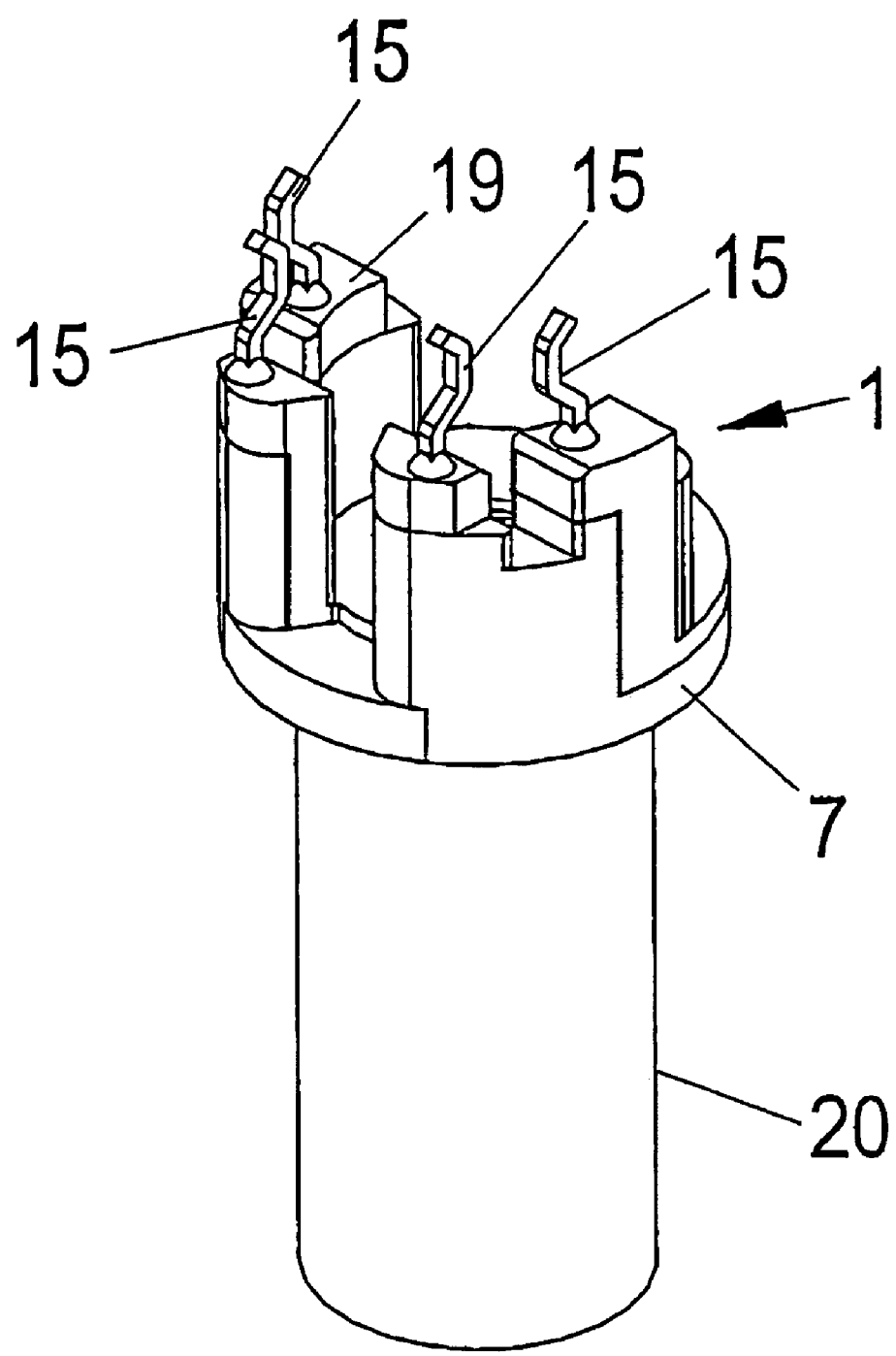
Figure 7:
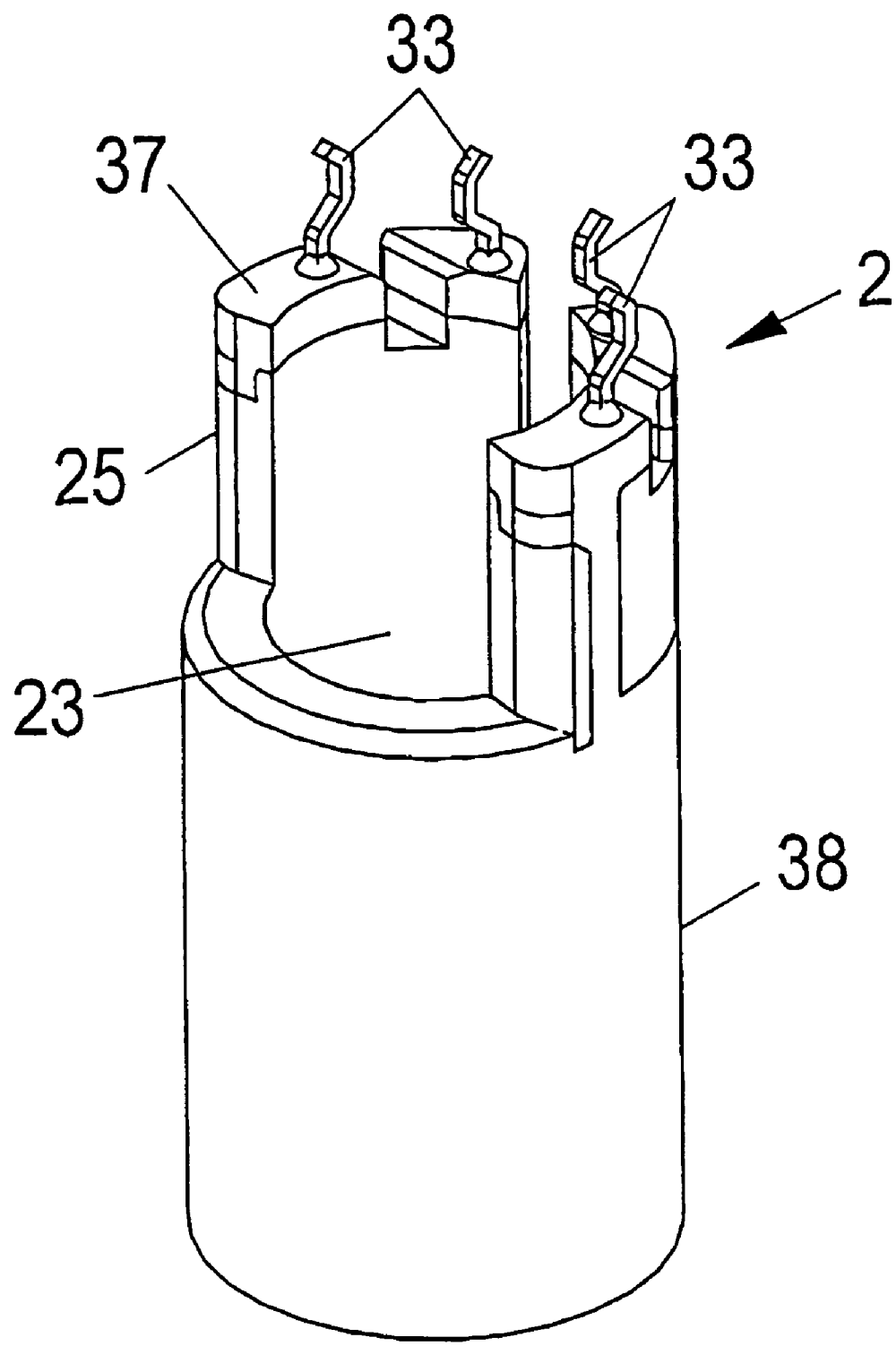

Further advantages and substantial details of the invention are to be taken from the following description of the drawings which show in a schematic representation preferred embodiments as an example. These are represented in:

FIG. 1 is a sectional side view, a structural part according to the invention with an electrical coil formed as a plug pin inserted into an electrical coil formed as a plug socket, FIG. 2 the basic body of the plug pin of FIG. 1 in a sectional side view, FIG. 3 the basic body of the plug pin of FIG. 2 in an overall view, FIG. 4 the completed plug pin electrical coil of FIG. 1 in an overall view, FIG. 5 the basic body of the plug socket of FIG. 1 in a sectional side view, FIG. 6 the basic body of the plug socket of FIG. 5 in an overall view, and FIG. 7 the completed plug socket electrical coil of FIG. 1 in an overall view.

The structural part according to the invention represented in the drawing is provided with an electrical coil in the form of a plug pin 1 which according to the representation in FIG. 1 can be inserted coaxially into another electrical coil which is designed in the form of a plug socket 2.

The plug pin 1 has a basic body 3 having a cylindrical portion 5 provided with a longitudinal bore 4. At the one end area of the cylindrical portion 5 there is provided a limitation collar 6 and at the opposite other end area there is provided a connection head 7. Further, the basic body 3 has two projecting ribs 8, 9, wherein the one rib 8 is provided at the cylindrical portion 5 with a small distance to the limitation collar 6 and the other rib 9 is provided with a small distance to the connection head 7. Thereby, both between the limitation collar 6 and the rib 8 as well as also between the connection head 7 and the rib 9 there is formed one undercut 10, 11 each. The ribs 8, 9 can advantageously be formed as part-circular segments and can at least have one relief 12.

The basic body 3 is manufactured as an injection molded part materially-uniform and integrally with the cylindrical portion 5, the limitation collar 6, the connection head 7 and the ribs 8, 9 in a form tool of an injection molding machine. This injection molded part consists of a thermoplastic synthetic material, for example Ultramid, the melting temperature of which during injection molding can be approximately 260° C., and which after the injection process solidifies to a hard synthetic material. On the basic body 3 there is arranged an electrical structural element which in the present embodiment is formed as a wire-wound coil 13, the coil wire 14 of which conveniently is wound directly onto the cylindrical portion 5. The ends of the coil wire 14 are contacted at connection pins 15, so that a reliable connection is ensured. For the shown plug pin 1 it can be advantageous first to apply a main winding 16 onto the basic body 3, which winding preferably may have two layers wound upon each other. Onto this main winding 16 then additionally a so-called auxiliary winding 17 can be applied which preferably has only one layer. For contacting the all together four coil wire endings, thus, there are provided also four connection pins 15. In the connection head 7 of the basic body 3 there are four passages 18 into which the connection pins 15 connected with the coil wire ends are placed such that one end portion of each of the connection pins 15 protrudes from one front side 19 of the connection head 7, so that at these end portions of the connection pins 15 there can be connected electrical conductors not shown here.

The basic body 3 thus provided with the windings 16, 17 and the connection pins 15 is now placed into another form tool of the injection molding machine and injection molded around with a thermoplastic synthetic material which preferably belongs to the same material group as the synthetic material of the basic body 3 (e.g., Ultramid). However, the two synthetic materials differ in that the second synthetic material intended for the molding around of the coil windings 16, 17 has a higher melting temperature than the synthetic material used for manufacturing the basic body 3. Preferably, the melting temperature of the second synthetic material can be about 20° to 30° C. higher than the melting temperature of the basic body 3 and can be approximately 280° to 290° C. During the injection molding process with the higher melting synthetic material the latter fills all free spaces and thereby enters also into the undercuts 10, 11, the relief 12 and into the passages 18. Due to the high heat energy the synthetic material of the basic body 3 is melted particularly in the area of the ribs 8, 9, the limitation collar 6, the connection head 7 and the wall of the cylindrical portion 5 such that an intimate fusion of the two synthetic materials results and a homogenous compound of the structures of the materials is achieved. After the injection molding process the higher melting synthetic material also solidifies to a hard synthetic material so that a hermetically tight encapsulation 20 results in which the windings 16, 17 as well as the connection pins 15 are embedded free of gaps and voids. By means of the undercuts 10, 11 and the ribs 8, 9 additionally a high mechanical compound strength is achieved by which it is ensured that contraction forces and mechanical stresses occurring during the solidification of the synthetic material are safely received and crackings are avoided.

The plug socket 2 is substantially designed in the same manner as the plug pin 1 and has a basic body 21 having a cylindrical portion 22 with a longitudinal bore 23. At the one end area of the cylindrical portion 22 there is provided a limitation collar 24, and at the opposite other end area there is a connection head 25. A rib 26 is provided with a small distance to the limitation collar 24 and another rib 27 is also provided with a small distance to the connection head 25, so that undercuts 28, 29 are formed. The ribs 28, 29 preferably can be designed as part-circular segments and can have at least one relief 30. The longitudinal bore 23 of the basic body 21 has a diameter which is only slightly greater than the diameter of the circular-cylindrical encapsulation 20 of the plug pin 1, so that the latter upon its insertion into the plug socket 2 is mounted closely and substantially play-free in the longitudinal bore 23 thereof.

The basic body 21 is manufactured as an injection molded part materially-uniform and integrally with the cylindrical portion 22, the limitation collar 24, the connection head 25 and the ribs 26, 27 in a form tool of an injection molding machine. This injection molded part consists of a thermoplastic synthetic material, for example Ultramid, the melting temperature of which during injection molding can be approximately 260° C., and which after the injection process solidifies to a hard synthetic material. On the basic body 21 there is arranged an electrical structural element which in the present embodiment is formed as a wire-wound coil 31, the coil wire 32 of which conveniently is wound directly onto the cylindrical portion 22. The ends of the coil wire 32 are contacted at connection pins 33, so that a reliable connection is guaranteed. For the shown plug socket 2 it can be advantageous first to apply a main winding 34 onto the basic body 21, which winding preferably may have two layers wound upon each other. Onto this main winding 34 then additionally a so-called auxiliary winding 35 can be applied which preferably has only one layer. For contacting the all together four coil wire endings, thus, there are provided also four connection pins 33. In the connection head 25 of the basic body 21 there are four passages 36 into which the connection pins 33 connected with the coil wire ends are placed such that one end portion of each of the connection pins 33 protrudes from one front side 37 of the connection head 25, so that at these end portions of the connection pins 33 there can be connected electrical conductors not shown here.

The basic body 21 thus provided with the windings 34, 35 and the connection pins 33 is then placed into another form tool of the injection molding machine and injection molded around with a thermoplastic synthetic material which preferably belongs to the same material group as the synthetic material of the basic body 21 (e.g., Ultramid). However, the two synthetic materials differ in that the second synthetic material intended for the molding around of the coil windings 34, 35 has a higher melting temperature than the synthetic material used for manufacturing the basic body 21. Preferably, the melting temperature of the second synthetic material can be about 20° to 30° C. higher than the melting temperature of the basic body 21 and can be approximately 280° to 290° C. During the injection molding process with the higher melting synthetic material the latter fills all free spaces and thereby enters also into the undercuts 28, 29, the relief 30 and the passages 36. Due to the high heat energy the synthetic material of the basic body 21 is melted particularly in the area of the ribs 26, 27, the limitation collar 24, the connection head 25 and the wall of the cylindrical portion 22 such that an intimate fusion of the two synthetic materials results and a homogeneous compound of the structures of the materials is achieved. After the injection molding process the higher melting synthetic material also solidifies to a hard synthetic material so that a hermetically tight encapsulation 38 results in which the windings 34, 35 as well as the connection pins 33 are embedded free of gaps and voids. By the undercuts 28, 29 and the ribs 26, 27 additionally a high mechanical compound strength is achieved by which it is ensured that contraction forces and mechanical stresses occurring during the solidification of the synthetic material are safely received and crackings are avoided.

As can further be seen from the drawing, it can be advantageous to design the diameter of the connection head 7 at the plug pin 1 greater than the diameter of the coil encapsulation 20. Thereby, the diameter of the connection head 7 can be about equal to or somewhat smaller than the diameter of the encapsulation 38 of the plug socket 2. Further, it may be advantageous to design the encapsulation 20 of the plug pin 1 and the encapsulation 38 of the plug socket 2 axially with about equal lengths.

Due to their hermetically tight and absolutely gap-free encapsulations the structural parts according to the invention can advantageously be used in potentially explosive areas or other critical environments, and they guarantee a high safety. By the magnetic field of the coil winding associated with the plug pin 1 a magnetic field can be induced in the coil winding of the plug socket 2 or vice-versa, so that a galvanically interrupted current transmission is possible. A galvanically interrupted current transmission device manufactured according to the invention can be disconnected in a potentially explosive surrounding without previous switching-off of the current circuits because there is no sparking at all.

We claim:

1. An electrical structural part, comprising:
   a) an electrical or electronic structural element;
   b) a basic body formed of a first hard thermoplastic synthetic material having a first melting temperature on which the structural element is arranged, wherein the basic body includes at least one protruding rib and at least one undercut formed adjacent to said at least one protruding rib; and
   c) an encapsulation tightly surrounding the structural element, formed of a second hard thermoplastic synthetic material having a second melting temperature which is higher than the first melting temperature, said second hard thermoplastic synthetic material engaging said at least one protruding rib and said at least one undercut, and wherein said second hard thermoplastic synthetic material of the encapsulation is intimately fused with said first hard thermoplastic synthetic material of the basic body so as to embed the structural element free of gaps and voids.

2. The structural part of claim 1, wherein the basic body has an axial longitudinal bore.

3. The structural part of claim 1, wherein encapsulation has a circular-cylindrical outer surface.

4. The structural part of claim 1, wherein the basic body has a longitudinal bore and the structural element includes an embedded coil winding which is in contact with connection pins so as to form a plug socket.

5. The structural part of claim 1 wherein the basic body has a longitudinal bore and the structural element includes an embedded coil winding which is in contact with connection pins so as to form a plug pin.

6. The structural part of claim 5, wherein the plug pin is axially insertable into a plug socket which comprises:
   a) an electrical structural element in the form of a coil winding which is in contact with connection pins;
   b) a basic body having a longitudinal bore and formed of a first hard thermoplastic synthetic material having a first melting temperature on which the structural element is arranged; and
   c) an encapsulation tightly surrounding the structural element, formed of a second hard thermoplastic synthetic material having a second melting temperature which is higher than the first melting temperature, wherein material of the encapsulation is intimately fused with material of the basic body so as to embed the structural element free of gaps and voids.

7. The structural part of claim 6, wherein the encapsulation of the plug pin includes an circular-cylinder outer surface having an outer diameter slightly smaller than an inner diameter of a longitudinal bore formed in the basic body of the plug socket.

8. The structural part of claim 6, wherein the plug pin has a connection head with a diameter greater than its encapsulation and substantially equal to the diameter of the encapsulation of the plug socket.

9. The structural part of claim 6, wherein the encapsulation of the plug pin and the encapsulation of the plug socket have substantially equal axial lengths.

10. The structural part of claim 6, wherein the cylindrical portion of the basic body of the plug socket includes a limitation collar at one end, and wherein the basic body of the plug socket includes a protruding rib adjacent to said limitation collar and an undercut between said limitation collar and said protruding rib, said second hard thermoplastic synthetic material of the encapsulation engaging said limitation collar, said protruding rib adjacent to said limitation collar and said undercut between said limitation collar and said protruding rib adjacent to said limitation collar.

11. The structural part of claim 1, wherein the structural element comprises an electrical coil winding including a coil wire which is arranged directly on the basic body.

12. The structural part of claim 11, wherein the coil winding includes a main winding and an auxiliary winding.

13. The structural part of claim 12, wherein the main winding is wound onto the cylindrical portion of the basic body and the auxiliary winding is wound onto the main winding.

14. The structural part of claim 12, wherein coil wire of the main winding comprises two layers wound one above the other and the auxiliary winding comprises one single winding layer.

15. The structural part of claim 11, wherein the basic body includes a cylindrical portion about which the coil winding is arranged.

16. The structural part of claim 15, wherein the cylindrical portion of the basic body includes a limitation collar at one end, and wherein the basic body includes a protruding rib adjacent to said limitation collar and an undercut between said limitation collar and said protruding rib, said second hard thermoplastic synthetic material of the encapsulation engaging said limitation collar, said protruding rib adjacent to said limitation collar and said undercut between said limitation collar and said protruding rib adjacent to said limitation collar.

17. The structural part of claim 16, wherein the cylindrical portion of the basic body includes a connection head at an end opposing said limitation collar, and the basic body includes a protruding rib adjacent to said connection head and an undercut between said connection head and said protruding rib, said second hard thermoplastic synthetic material of the encapsulation engaging said connection head, said protruding rib adjacent to said connection head and said undercut between said connection head and said protruding rib adjacent to said connection head.

18. The structural part of claim 16, wherein the rib adjacent to said limitation collar has at least one relief, said second hard thermoplastic synthetic material of the encapsulation engaging said at least one relief.

19. The structural part of claim 17, wherein the connection head of the basic body has at least one passage into which a connection pin in contact with an end of the coil wire is embedded free of voids, said second hard thermoplastic synthetic material of the encapsulation engaging said at least one passage.

20. The structural part of claim 19, wherein an end portion of the connection pin extends beyond the connection head at a front side opposite to the cylindrical portion.

* * * * *